(12) United States Patent
Oetiker et al.

(10) Patent No.: US 8,645,015 B2
(45) Date of Patent: Feb. 4, 2014

(54) SEMIAUTOMATIC PARKING MACHINE

(75) Inventors: Moritz Oetiker, Zürich (CH); Gion Baker, Caslano (CH)

(73) Assignee: Cobra Automotive Technologies SpA, Varese (IT)

( * ) Notice: Subject to any disclaimer, the term of this patent is extended or adjusted under 35 U.S.C. 154(b) by 726 days.

(21) Appl. No.: 12/528,588

(22) PCT Filed: Feb. 20, 2008

(86) PCT No.: PCT/EP2008/052067
§ 371 (c)(1),
(2), (4) Date: Dec. 9, 2010

(87) PCT Pub. No.: WO2008/104488
PCT Pub. Date: Sep. 4, 2008

(65) Prior Publication Data
US 2011/0082613 A1    Apr. 7, 2011

(30) Foreign Application Priority Data

Feb. 28, 2007  (DE) .......................... 10 2007 009 745

(51) Int. Cl.
*G05D 1/00* (2006.01)
(52) U.S. Cl.
USPC .......... 701/25; 701/300; 701/302; 340/932.2; 340/933; 340/425.5; 340/436
(58) Field of Classification Search
None
See application file for complete search history.

(56) References Cited

U.S. PATENT DOCUMENTS

| 3,117,642 | A | * | 1/1964 | Larinoff .......................... 180/204 |
| 5,742,141 | A | * | 4/1998 | Czekaj ............................ 318/587 |
| 6,061,002 | A | * | 5/2000 | Weber et al. ................. 340/932.2 |
| 6,170,591 | B1 | * | 1/2001 | Sakai et al. .................... 180/204 |
| 6,275,754 | B1 | | 8/2001 | Shimizu et al. |
| 6,476,730 | B2 | * | 11/2002 | Kakinami et al. .......... 340/932.2 |
| 6,476,731 | B1 | * | 11/2002 | Miki et al. ..................... 340/937 |

(Continued)

FOREIGN PATENT DOCUMENTS

| DE | 103 22 829 | 12/2004 |
| DE | 601 05 684 | 2/2005 |

(Continued)

OTHER PUBLICATIONS

English translation of the Written Opinion of the International Searching Authority for International Application No. PCT/EP2008/052067.

(Continued)

*Primary Examiner* — Jonathan M Dager
(74) *Attorney, Agent, or Firm* — Alston & Bird LLP

(57) ABSTRACT

The invention relates to a device and a method for controlling the steering of a vehicle during a parking maneuver. To this end first the parking spot selected for parking the vehicle is surveyed. Based on said survey, an orientation field is prepared, which defines a target orientation for a plurality of positioning points inside the selected parking spot and in the surroundings of the parking spot, the vehicle being guided along these points from any arbitrary point inside the orientation field to the target point of the parking maneuver. The control of the vehicle occurs by comparing the respective current orientation thereof to the target orientation specified for the respective position in the orientation field and by an appropriate adjustment of the steering angle by the vehicle orientation to said target orientation.

18 Claims, 9 Drawing Sheets

(56) References Cited

U.S. PATENT DOCUMENTS

| | | | |
|---|---|---|---|
| 6,587,760 B2* | 7/2003 | Okamoto | 701/1 |
| 6,657,555 B2* | 12/2003 | Shimizu et al. | 340/932.2 |
| 6,711,473 B2* | 3/2004 | Shimazaki et al. | 701/1 |
| 6,825,880 B2* | 11/2004 | Asahi et al. | 348/333.02 |
| 6,999,002 B2* | 2/2006 | Mizusawa et al. | 340/932.2 |
| 7,053,795 B2* | 5/2006 | Maemura et al. | 340/932.2 |
| 7,075,456 B2* | 7/2006 | Tanaka et al. | 340/932.2 |
| 7,076,345 B2* | 7/2006 | Tanaka et al. | 701/28 |
| 7,451,020 B2 | 11/2008 | Goetting et al. | |
| 7,598,887 B2* | 10/2009 | Sato et al. | 340/932.2 |
| 7,640,108 B2* | 12/2009 | Shimizu et al. | 701/301 |
| 7,656,423 B2* | 2/2010 | Hagisato et al. | 348/148 |
| 7,751,958 B2* | 7/2010 | Yoshiguchi et al. | 701/36 |
| 8,010,283 B2* | 8/2011 | Yoshida et al. | 701/519 |
| 8,056,667 B2* | 11/2011 | Moshchuk et al. | 180/169 |
| 8,130,269 B2* | 3/2012 | Mori et al. | 348/148 |
| 8,299,941 B2* | 10/2012 | Faber | 340/932.2 |
| 8,396,653 B2* | 3/2013 | Rottner et al. | 701/300 |
| 2001/0017591 A1* | 8/2001 | Kuriya et al. | 340/932.2 |
| 2001/0030688 A1* | 10/2001 | Asahi et al. | 348/118 |
| 2002/0084916 A1* | 7/2002 | Shimizu et al. | 340/932.2 |
| 2003/0150661 A1* | 8/2003 | Kataoka et al. | 180/204 |
| 2005/0021203 A1* | 1/2005 | Iwazaki et al. | 701/36 |
| 2005/0049766 A1* | 3/2005 | Tanaka et al. | 701/36 |
| 2005/0055139 A1* | 3/2005 | Tanaka et al. | 701/1 |
| 2005/0236201 A1* | 10/2005 | Spannheimer et al. | 180/204 |
| 2005/0264432 A1* | 12/2005 | Tanaka et al. | 340/932.2 |
| 2006/0287826 A1* | 12/2006 | Shimizu et al. | 701/216 |
| 2007/0051547 A1* | 3/2007 | Fischer et al. | 180/204 |
| 2007/0088474 A1* | 4/2007 | Sugiura et al. | 701/36 |
| 2008/0033606 A1* | 2/2008 | Okamoto et al. | 701/28 |
| 2008/0077294 A1* | 3/2008 | Danz et al. | 701/41 |
| 2010/0033348 A1* | 2/2010 | Kawabata et al. | 340/932.2 |
| 2010/0066515 A1* | 3/2010 | Shimazaki et al. | 340/435 |

FOREIGN PATENT DOCUMENTS

| | | |
|---|---|---|
| DE | 10 2004 011088 A1 | 8/2005 |
| DE | 10 2005 062 086 | 7/2006 |
| EP | 1 400 410 A2 | 3/2004 |
| FR | 2 728 859 | 7/1996 |
| JP | H 0628598 | 2/1994 |
| JP | H 10264839 | 10/1998 |
| WO | WO 2006/064544 A1 | 6/2006 |
| WO | WO 2006 133 996 | 12/2006 |

OTHER PUBLICATIONS

International Search Report for International Application No. PCT/EP2008/052067 completed Jun. 10 2008.

* cited by examiner

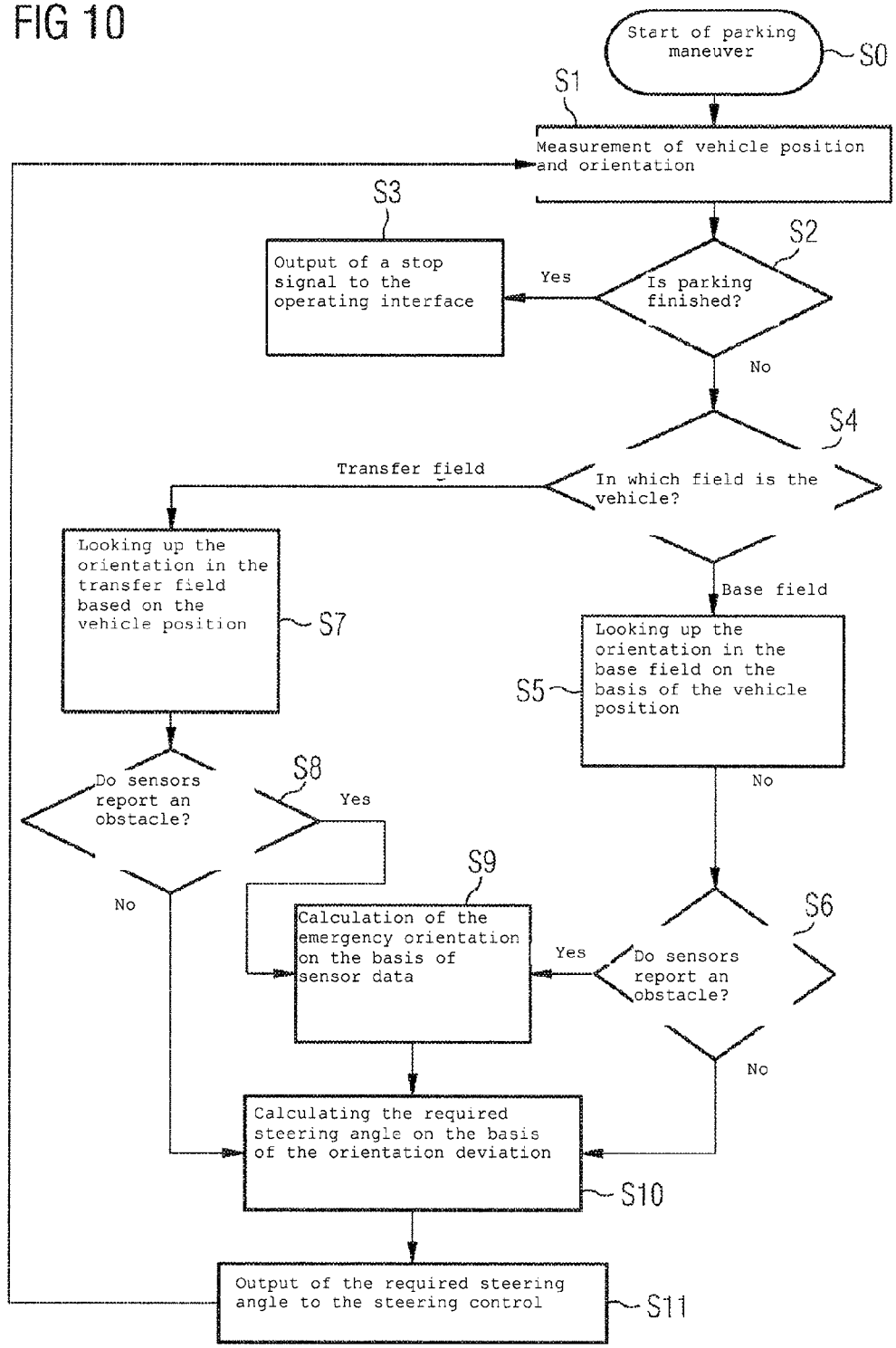

FIG 12A  v=1.5 meters per second
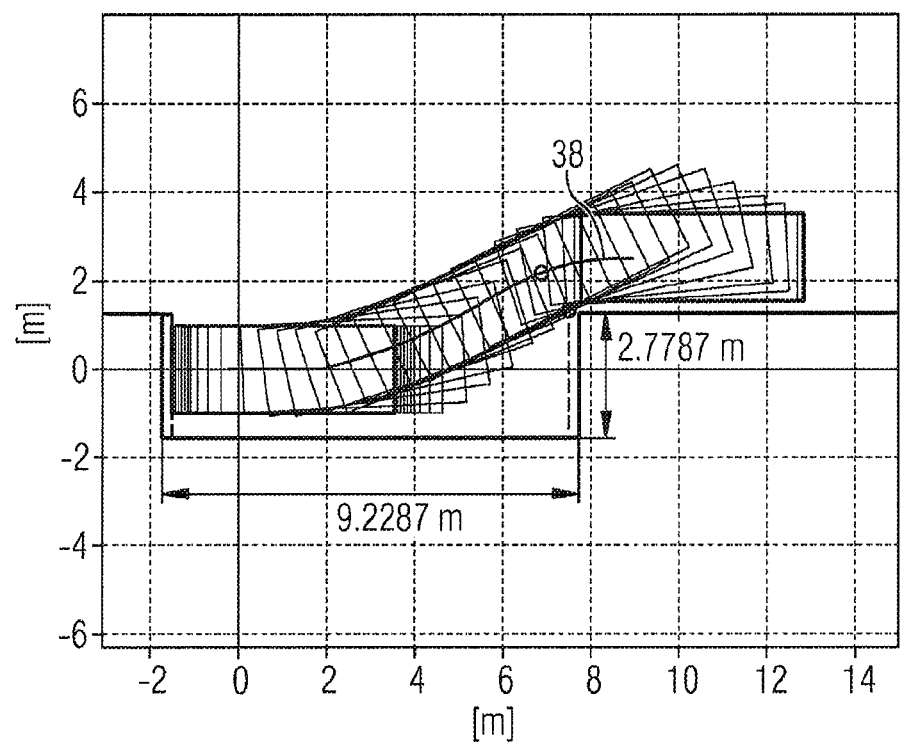
FIG 12B  v=2.5 meters per second
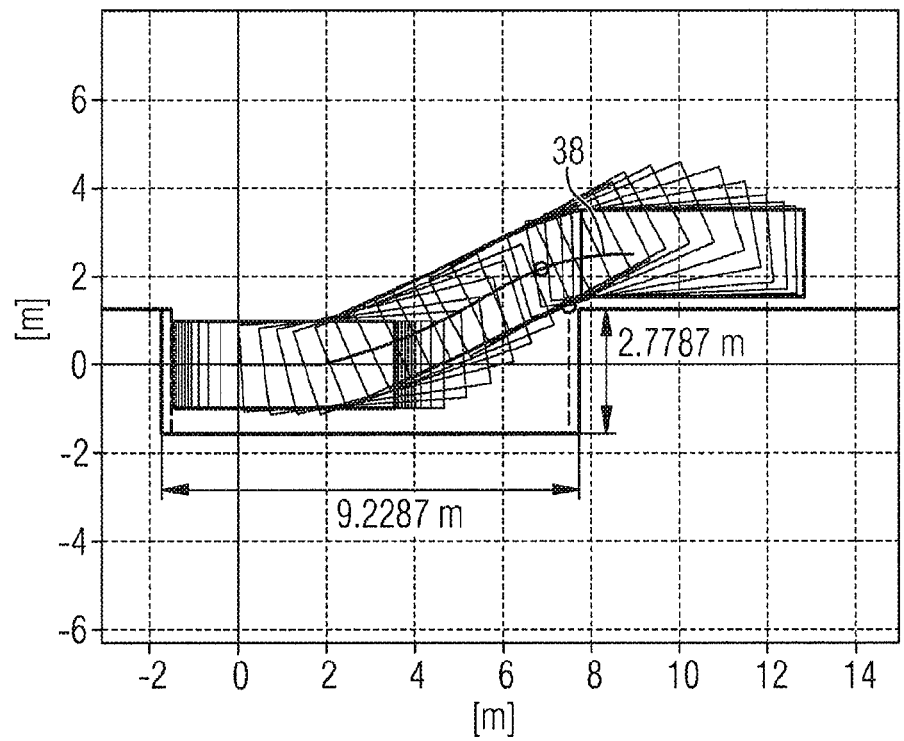

SEMIAUTOMATIC PARKING MACHINE

BACKGROUND OF THE INVENTION

1. Field of the Invention

The invention relates to a driver assistance system for motor vehicles and relates in particular to a semiautomatic parking aid for multilane vehicles.

2. Description of Related Art

Parking aids assist a driver of a vehicle in parking his vehicle. In the past, essentially passive parking aids in the form of orientation objects on the motor vehicle or on the parking spot have been predominant, but in recent years active parking aids in particular have taken precedence. As a rule, ultrasonic sensors are installed in the rear bumpers and occasionally also in the front bumpers of the vehicle to measure the distance from such obstacles based on a determination of the transit time of the ultrasonic waves emitted by the sensors and reflected on these obstacles. If the measured distance is less than a predefined value, then a warning signal is output in general, the frequency of repetition of this signal increasing progressively with a further reduction in distance. These so-called active systems reduce the risk of a collision with obstacles or people in the vicinity of the vehicle. However, the driver of the vehicle does not receive any assistance in maneuvering into the parking space or parking spot with these systems.

Driver assistance systems, which measure the size of a potential parking space and take over the steering of the vehicle during parking, have been developed for this purpose. The corresponding parking assistance systems usually operate semiautomatically. They are activated by the driver of the vehicle as needed and they measure the available space by means of ultrasonic sensors as the vehicle drives slowly past the parking space. After the driver has stopped the vehicle, a control unit in the parking assistance system (assuming the parking space is large enough) calculates the ideal parking path from the starting position. Finally, the driver of the vehicle engages the reverse gear and limits his actions to accelerating, clutching and braking while a steering actuator, controlled by the control unit, takes over the steering of the vehicle until the optimum parking position has been reached.

SUMMARY OF VARIOUS EMBODIMENTS

A specified value for the parking path is calculated as a target path by the driver assistance system before the start of the actual parking maneuver. The target path is usually determined from a measured vehicle startup position, i.e., the initial position, and optionally a measured initial vehicle orientation in relation to the parking space as well as the dimensions of the parking space determined previously. The path of the center of the rear axle is usually selected as the target path. Vehicle orientation is understood to refer to the orientation of a vehicle axle, primarily the longitudinal axis of the vehicle. The steering angle settings assigned to the individual path distances of the target path are calculated in advance with the target path.

The steering actuator is then controlled in the course of the parking maneuver in accordance with the steering angle settings calculated for the respective progress of the vehicle on the target path.

In this context, it should be pointed out that in deviation from German linguistic usage, the term "control" in this document is used as equivalent to the term "regulate" unless explicitly stated otherwise. This also applies to all grammatical modifications of these terms. Therefore, the term "control" in this document may refer to feedback of a controlled variable and/or its measured value, and the term "regulation" may also refer to a simple control loop.

With the parking assistant described above, no change is made in the target path during the parking maneuver. If the dimensions of the parking space have not been determined accurately or if there are sudden changes in the vehicle environment, e.g., a vehicle changing its position, there is therefore also no adaptation of the parking path stipulation.

Furthermore, with these systems the parking speed is limited to a maximum speed at which the steering actuator can just set the required path curvature as specified. Since the driving speed in parking is not known at the time of calculation of the target path, in general a low speed is assumed, which will bring good results even with narrow parking spaces that require a sharp steering angle. However, if the driver of the vehicle drives at a higher speed, the steering actuator can no longer correctly set the required steering angles so that the vehicle deviates from the target path and cannot drive far enough into the parking space.

Against this background, the object of the present invention is to provide a driver assistance system that will allow an adaptation of the parking path to the speed of the vehicle being parked and to changes in its environment.

This object is achieved according to the independent claims of the invention.

The invention comprises a method for controlling the steering of a vehicle during a parking maneuver with steps for measuring the parking spot selected for parking the vehicle, for creating an orientation field which determines a number of position points within the selected parking spot and in the environment of the selected parking spot and assigns a target orientation to each position point for determination of the position and orientation of the vehicle to be parked in relation to the position points of the orientation field and for controlling the steering angle of the vehicle in such a way that the orientation of the vehicle with a position point assumes essentially the target orientation assigned to this position point in the orientation field.

In this context, it is pointed out that the terms "comprise," "have," "contain," " . . . " and "with" as used in this description and in the claims for enumerating features as well as the grammatical modifications thereof are in general to be interpreted as a non-definitive enumeration of features, e.g., method steps, equipment, ranges, sizes and the like, which by no means precludes the presence of other or additional features or groups of other or additional features.

The invention also includes a device for controlling the steering of the vehicle during a parking maneuver. The device has a sensor mechanism, which is designed for measuring a parking spot and for detecting an obstacle; also a vehicle position determining device, which is designed at least for determining the vehicle position and vehicle orientation, a gear selector detection device, which is designed for output of a signal representing the gear currently selected for the vehicle, an operator interface for input of instructions by the driver of the vehicle and/or for output of information to the driver of the vehicle, an electromechanical control unit for controlling the steering angle of the vehicle and a parking path guidance device for calculating the steering angles to be set by the electromechanical steering unit for guiding the vehicle along a parking path. The parking path guidance device has a parking spot determination unit, which is designed in cooperation with the sensor device for determination of the geometry of the parking spot selected for parking the vehicle and of obstacles in the environment of the vehicle; also an orientation field generating device which is designed for creating an orientation field which determines a number of position points within the selected parking spot and in the environment of the selected parking spot and assigns a target orientation to each position point, an orientation deviation device for determining the deviation of the current vehicle orientation at a position point from the target orientation predefined for this position point by the orientation field, and has a steering angle preselection device, which is designed for calculating a preselected steering angle for the electromechanical steering unit on the basis of the orientation deviation of the vehicle from the target orientation and for forwarding the preselected steering angle to the electromechanical steering unit.

In addition, the invention comprises a computer program product for controlling the steering of a vehicle during a parking maneuver, whereby the computer program product has a series of physically differentiable states that can be read and executed by a data processing system and represent a sequence of instructions which, when executed on the data processing system, execute a method as defined above and form a device according to what is described above.

The invention allows flexible control of a vehicle in a parking maneuver without being fixed on one target path for the parking path by indicating, at each possible position of the vehicle to be parked, a direction which the vehicle must travel to approach the destination of the parking maneuver.

The invention will be further embodied in its dependent claims.

To obtain a defined end point of a parking maneuver, one of the position points from the number of position points expediently forms the destination point of a parking path of the vehicle. The target orientation assigned to a position point advantageously corresponds to the orientation of the tangents to a parking path leading through the position point with which a simple path guidance is achieved. Since all parking paths defined based on the target orientations of the position points have the same target point, the vehicle is advantageously always guided to the same destination point regardless of the parking path taken. A defined parking position is thereby reached, regardless of the parking path.

To deal with the position of the vehicle relative to the parking spot by a simple method, the orientation field is preferably constructed on the basis of a first orientation subfield and a second orientation subfield, such that the first orientation subfield comprises the target orientations assigned to the parking spot and the second orientation subfield comprises the target orientations assigned to a corner point of the parking spot. The second orientation subfield is advantageously connected here to the first orientation subfield in such a way that the position of the shared position point of the parking path sections of the second orientation subfield corresponds to the position of a position point of the first orientation subfield whose distance from the corner point of the parking spot is great enough, so that the vehicle at this position point does not come in contact with the corner point of the parking spot in the target orientation predefined at this position point.

To avoid abrupt changes in steering, the second orientation subfield is rotated in connection to the first orientation subfield, so that the target orientation of the shared position point of the second orientation subfield corresponds to the target orientation of the position point of the first orientation subfield with whose position the shared position point is brought into agreement.

Controlling the steering angle of the vehicle at a position point of the orientation field is preferably performed on the basis of the deviation between the actual orientation assumed by the vehicle at this position point and the target orientation preselected for this position point.

To be able to respond in a flexible manner to changes in the parking situation, as soon as it is recognized that there is a risk of collision with an obstacle if the target orientations of the orientation field are followed, the vehicle is expediently driven along an orientation leading around the obstacle until there is no longer a risk of collision. If necessary, the steering required for the orientation leading around the obstacle is calculated from the distance determined with the sensors according to a predefined rule, so that the vehicle maintains a minimum distance from the obstacle.

The orientation leading around the obstacle is advantageously achieved by a readjustment of the orientation field by means of a shifting of the shared position point of the second orientation subfield to another position point of the first orientation subfield whose distance from the obstacle and whose target orientation are suitable, so that the vehicle does not come in contact with the obstacle at this additional position point in the target orientation predefined at this additional position point. Alternatively or additionally, the orientation leading around the obstacle may be oriented in parallel to the side border of the parking spot until a path distance has been traveled beyond which the vehicle can be maneuvered into the parking spot without a collision. If the parking spot is shortened in the rear area, then the target point of the parking paths assumed as the basis for the orientation field is preferably shifted.

BRIEF DESCRIPTION OF THE SEVERAL VIEWS OF THE DRAWINGS

Additional features of the invention are derived from the following description of inventive exemplary embodiments in conjunction with the claims and the figures. The individual features may be implemented separately or in combination in an embodiment according to the invention. In the following explanation of some exemplary embodiments of the invention, reference is made to the accompanying figures, in which FIG. 10 shows a flow chart illustrating the essential steps of the method performed by the parking assistant in assisting the driver of the vehicle in the parking maneuver, FIG. 12 shows the different parking paths pursued at different vehicle speeds.

DETAILED DESCRIPTION

Figure 1:
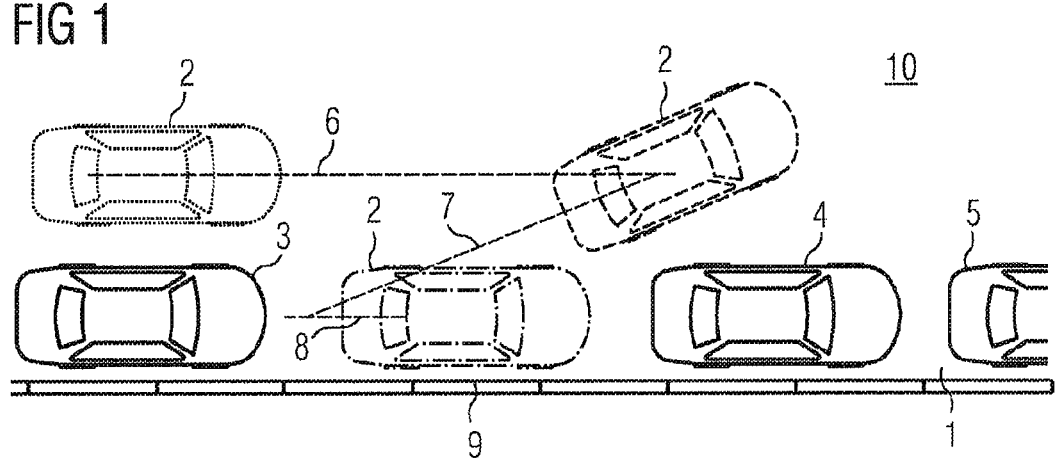
FIG. 1 shows a parking maneuver.

FIG. 1 shows a typical parking maneuver 10 in parallel parking within a community. Several parallel-parked vehicles 3, 4 and 5 are situated on the road surface 1 close to the border 9 of the road surface. The space between the vehicles 3 and 4 is large enough, so that another vehicle can park there, thus forming a so-called parking space. The various possibilities of parking vehicles are subsumed below under the general term "parking spot" because not only parking spaces but also other options, e.g., parking bays or converted, partially converted or simply marked parking spots may also be used for parking. In the present document, this term "parking spot" is limited to a parking option for a single vehicle.

In the parallel parking illustrated in FIG. 1, the vehicle 2 drives along the path shown as a dotted line 6, past the vehicle 3 bordering the parking space at the rear up to the level of the vehicle 4 bordering the parking space at the front. For parking, the driver of the vehicle 2 engages the reverse gear and steers the vehicle 2 into its parked position along the parking path represented by the line segments 7 and 8 shown with dotted lines.

Figure 3:
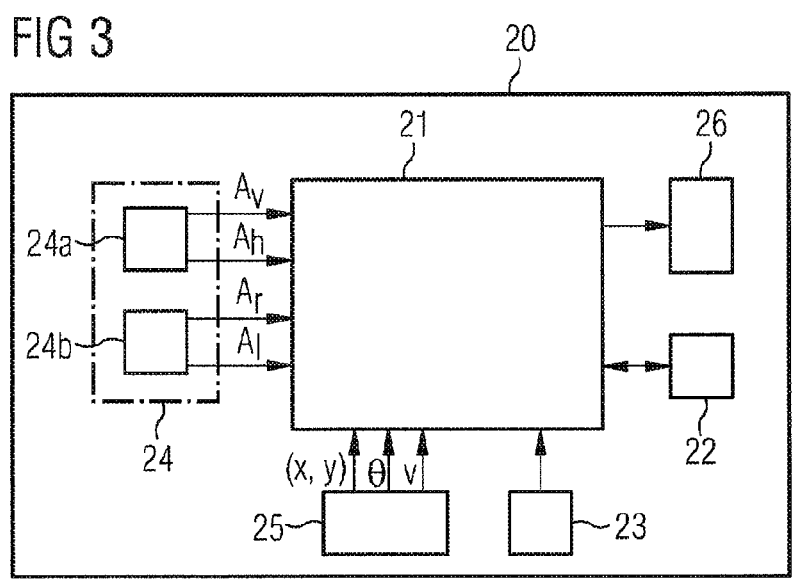
FIG. 3 shows a block diagram of the parking assistant.

For partial automation of the parking maneuver, the driver of the vehicle activates the parking assistant 20 (see FIG. 3), e.g., at the position shown by the vehicle 2 represented with dotted lines. The activation is performed via an operator or user interface 22. The activation is usually performed before reaching the parking space, but it may also be performed later under the condition that the parking assistant 20 can measure with sufficient accuracy the parking space available in that spot by means of the sensor device 24. The parking spot is measured while the vehicle 2 is passing by the parking space. To initiate the parking maneuver, the driver stops his vehicle 2 approximately at the level of vehicle 4, which borders the parking spot at the front. The parking assistant 20 then generates an orientation field in which a number of position points are defined in the parking spot to be measured and at least in the area claimed by the vehicle for turning into the space. A target orientation in the form of a specified angle is assigned to each of these position points in the orientation field.

When the driver of the vehicle engages the reverse gear, the position point of the orientation field corresponding to the current position of the vehicle 2 is ascertained, and the current orientation of the vehicle 2 is compared with the target orientation assigned to this position point. If the orientation of the vehicle 2 deviates from the target orientation, the parking assistant 20 readjusts the steering angle according to the deviation. This readjustment of the steering angle is performed on all position points passed by the vehicle 2 during the parallel parking (vehicle 2 shown with dotted lines) until the vehicle has reached the rear end of the parking spot (taking into account a certain safety margin for parallel parking) or has already reached its final parking position (vehicle 2 shown with a dash-dot line). From the rear of the parking spot, the vehicle 2 may then be driven into its final parking position, either with or without the support of the parking assistant. If the parking assistant is used, another orientation field may be generated for the parking space in the forward direction. In a few cases, however, the vehicle has only just been parked, so that the original orientation field and the use of a new end point of the second step of the parking maneuver can be selected.

In general, the parking assistant 20 controls only the steering during the parking maneuver. Engaging the gears, accelerating, clutching and braking are the responsibility of the driver of the vehicle. Therefore the parking assistant is a semiautomatic system. However, the parking assistant may give the driver of the vehicle a signal for braking, depending on the distance detected by the sensor device 24 from the other vehicles and/or from other objects and people. According to an advantageous further embodiment, braking of the vehicle by the parking assistant may be performed automatically at least when the distance of the vehicle 2 from an object or a person is less than a certain minimum distance.

Figure 2:
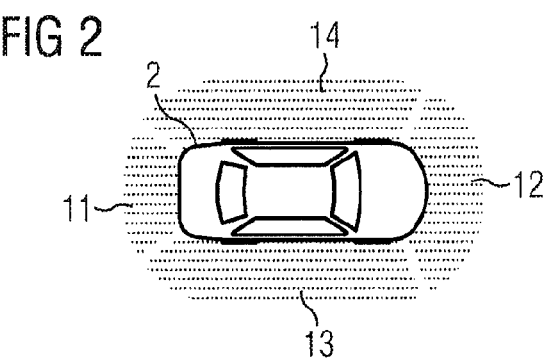
FIG. 2 shows a schematic diagram of the sensor detection areas of a parking assistant.

To enable collision-free parking, the sensor device 24 measures the distances from objects and people in the environment of the vehicle 2. The sensor device 24 is therefore expediently equipped with multiple sensors which, as illustrated in FIG. 2, detect an area around the vehicle 2. When using ultrasonic sensors, the sensors are advantageously installed in the bumpers. For complete detection of the side areas of the vehicles, additional ultrasonic sensors may also be installed in the area of the side door sills. Detection areas 11, 12, 13 and 14 can then be implemented as illustrated in FIG. 2. Instead of ultrasonic systems or other transit time-based systems such as radar or lidar, the use of cameras is also possible in conjunction with image analysis to determine the distances and to measure the parking spaces. Sensor systems for the distance measurement and/or warning in the front and trunk areas of vehicles are currently standard equipment for new vehicles, therefore these existing systems 24a can be integrated into the sensor device 24 and expanded by including a sensor system 24b for the distance measurement and/or warning in the two side areas of the vehicle. Based on these measurements, the sensor device 24 supplies the respective current values for the distances $A_v$ from obstacles in the front area of the vehicle, $A_h$ from obstacles in the rear area of the vehicle, $A_r$ from obstacles at the right of the vehicle and $A_l$ for obstacles at the left of the vehicle.

The parking assistant 20 also comprises a vehicle position determining device 25, which is designed for detecting the current position (x, y) and the current orientation θ of the vehicle 2 relative to the parking spot. The vehicle position determining device 25 may also be designed for determining the vehicle speed v. The vehicle position determining device 25 preferably comprises an odometer device, which derives a determination of the position, orientation and speed of the vehicle from the measurement of the movement of at least one wheel of the vehicle, preferably using the diameter of at least one of the rear wheels.

Since the actual parking maneuver in parallel parking is initiated when the reverse gear is engaged, the parking assistant 20 also has a gear selection detecting device 23, which is designed at least for detecting a reverse gear that has been engaged. The information about the gear currently engaged is forwarded to the parking path guidance device 21 in the form of an electric signal.

An operator interface 22 serves to activate the parking assistant and to output instructions or warnings to the driver of the vehicle. In the simplest case, the operator interface 22 comprises an optical signal lamp or an LED for displaying the activation of the parking assistant. Graphic output or text output, however, may also be displayed by an onboard display screen. Audio-assisted or audio visual output is recommended for rapid communication.

The actual control of the steering angle is accomplished via the electromechanical steering control 26 which comprises an electronic circuit and a steering actuator which is controlled with it and adjusts the steering angle of the front wheels. The control of the steering actuator is accomplished on the basis of steering angle signals, which are generated by the parking path guidance device 21 according to one of the methods described below.

After activation of the parking assistant 20, the parking path guidance device 21 first performs a measurement of the parking space with the help of the sensor device 24. The dimensions of the parking spot available there are determined from the measured data and stored in a memory device of the parking assistant 20 or in a storage device accessible thereto. To minimize the computation complexity, the parking spot is approximated by a rectangular geometry inside the available parking space. For a simplified diagram, no distinction is made subsequently between the actual parking spot and its virtual representation in the form of data about the geometry thereof. In addition to the measurement of the parking space itself, the sensor-assisted measuring device also allows a determination of the position of the vehicle 2 relative to the parking spot. The steering assistant in parking begins at the position at which the driver of the vehicle changes the direction of travel and/or engages the reverse gear. This position is referred to below as the starting position.

After conclusion of the parking spot measurement, the parking path guidance device 21 generates a field of position points covering the parking space as well as an area next to the parking space which connects the starting position of the vehicle 2 to the parking space. A target orientation is assigned to each of the position points, reflecting the direction of a path at this point, on which the vehicle would best travel from this position point to a destination point situated in the parking space. The position points and the respective target orientations thus form an orientation field in which the starting point of the vehicle 2 as well as the destination point of the parking maneuver are included and which shows the best direction to the destination point for the vehicle 2 at each position covered by the field.

After the leaving the starting position in the direction of the parking spot, the current position and the orientation of the vehicle 2 are each detected regularly. The determination is preferably performed within the context of a (Cartesian) coordinate system 31 whose origin is identical to the destination point of the parking maneuver and which has a coordinate axis running approximately parallel to one of the edges of the parking spot (see FIG. 5, for example). Other coordinate systems with the origins situated otherwise may of course also be used. They are recommended in particular when the calculation of the orientation field can then be performed more easily, i.e., with less computation effort.

After each detection of a vehicle position and orientation, the parking path guidance device 21 compares the detected vehicle orientation with the target orientation which is assigned to the position point in the orientation field corresponding to the detected vehicle position. If the current vehicle orientation does not correspond to the respective target orientation, the parking path guidance device 21 generates a steering control signal which takes into account the deviation and which is forwarded to the electromechanical steering control 26 for steering correction. The steering control signal may be limited to a mere steering correction signal but it may also represent the current steering angle to be taken by the steering of the vehicle 2.

Instead of preselecting a target path for the parking path, the orientation field indicates a direction which will lead the vehicle to the destination point, and does so for each point in an area range which covers the starting point and destination point of the parking maneuver. To allow an estimate of the target position to be reached in the parking spot, a proposal for a parking path may be calculated after creation of the orientation field, on the basis of which the expected quality of the parking maneuver can be evaluated at the start of the parking maneuver. However, if the vehicle 2 deviates from this proposed parking path during the parking maneuver because of excessive speed or sudden or shifting obstacles, then the vehicle need not be steered back to this proposed path, as with the known systems described above, or the path recalculated but instead the vehicle follows the orientation stipulations derived from the orientation field for its respective positions. In other words, a deviation leads from a parking path pursued initially to a new parking path. It is not necessary to recalculate the parking path.

For better handling of various parking space dimensions and changing obstacles, the orientation field is made up of two individual subfields. The first of these two orientation subfields is linked to the destination point of the parking maneuver within the parking spot. This serves to guide the destination point of the vehicle 2 within the parking spot; because of its attachment to the parking space, this is referred to as the origin field or base field. The target orientations contained in the base field each represent the direction the vehicle should travel on its path to the destination point at the respective positions. The second of the orientation subfields is linked to a transfer point at which the vehicle 2 is transferred from the second orientation subfield to the first orientation subfield. The position of the transfer point is derived from the dimensions of the parking space and/or the parking spot available therein and the destination point(s) available therein. The position of the transfer point is defined by the requirement of a collision-free transfer of the vehicle 2 from the starting position to the parking spot.

The vehicle is driven passed the transfer point with the orientation corresponding to the target orientation of the position point which corresponds to the transfer point in the base field. Thus the origin field can guide the vehicle 2 by means of its orientation stipulations to the destination point(s) without a collision. To do so, the second orientation subfield is rotated in combining the two orientation subfields so that the target orientation of the transfer point defined therein corresponds to the target orientation of the position point defined as the transfer point in the base field.

The choice of the transfer point in the base field depends essentially on the position of the corner point of the parking spot which the vehicle 2 must pass by when turning into the parking spot, the position of the starting point of the parking maneuver and the dimensions of the vehicle 2 as well as its chassis. The center of the rear axle is preferably selected as the reference point for the determination of the vehicle position. Other reference points are possible and can be converted one into the other by means of simple coordinate transformation. The length and width of the vehicle 2, its wheel base, the width of the rear axle and the overhang of the vehicle body over the rear axle are of interest in particular for the definition of the transfer point.

To be able to respond in a flexible manner to changes in the parking path, several transfer points in the form of a transfer field, each allowing a collision-free turning, are preferably defined in the base field. Any deviation from the transfer point as originally defined, e.g., due to a change in the parking space dimensions, thus requires only a displacement of the two orientation subfields relative to one another. The displacement can be accomplished by a displacement of the base field, of the second orientation subfield or displacement of both.

Figure 4:
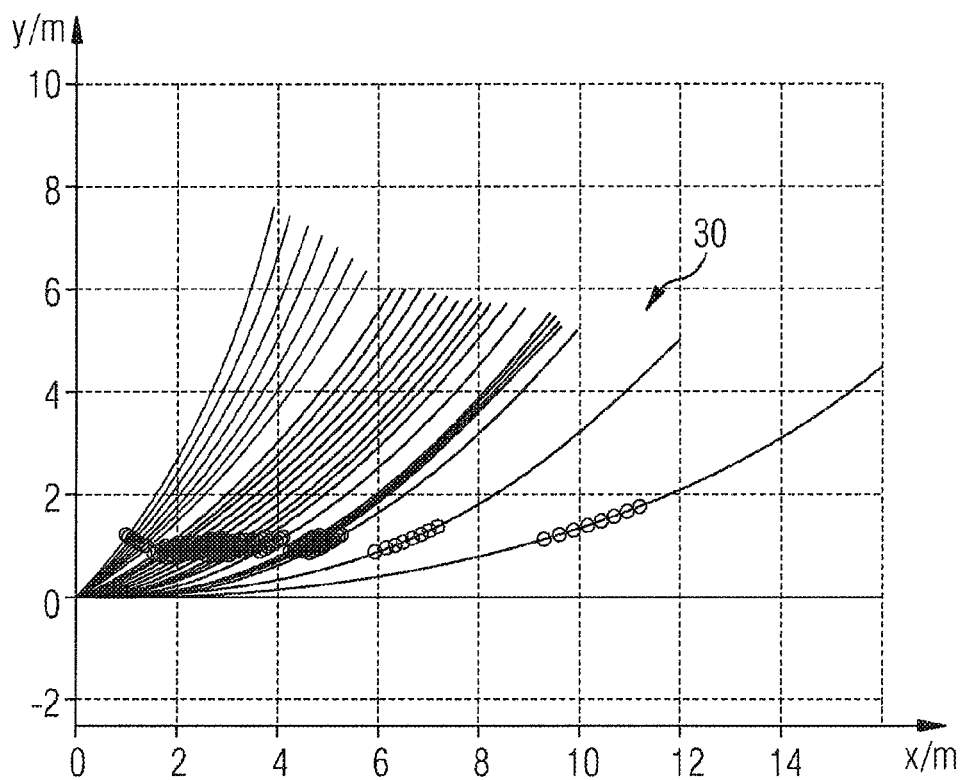
FIG. 4 shows an example of a set of paths for a base field.
Figure 5:
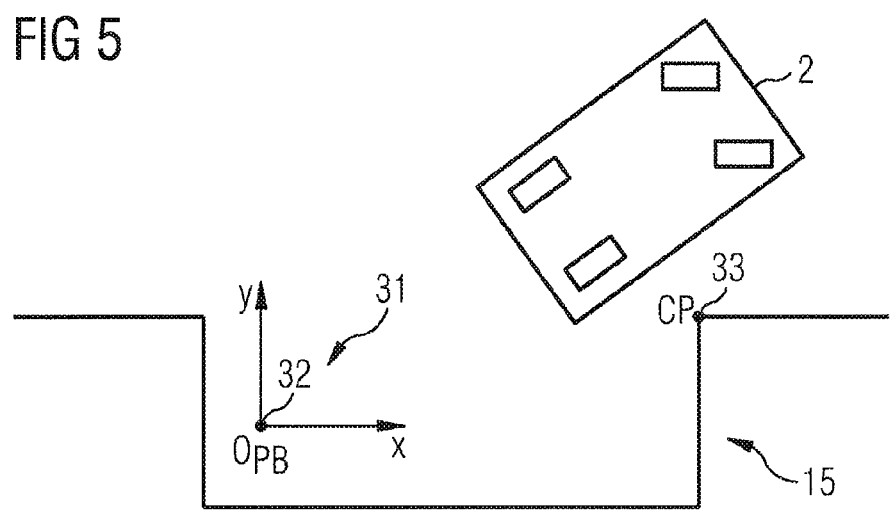
FIG. 5 shows the parking spot assigned to a parking space with an indication of the basic coordinate system and the corner point of the parking spot.

The origin field or the base field is constructed from a set of paths whose common origin corresponds to the destination point in the parking spot and which lead out of the parking spot away from the side border thereof. Creation of the individual paths takes into account stipulations with regard to the path directions at the destination point and the maximum allowed path curvature. The paths of the set are each generated in such a way that each path has the minimal path length under these stipulations. FIG. 4 shows a base field set of paths 30 generated accordingly. The circles situated on the individual paths indicate the position of possible transfer points, which will be discussed in greater detail below. FIG. 5 shows the parking spot 15 used as the basis for the set of paths in FIG. 4 with the base field coordinate system 31 placed therein at the origin 32 of the base field and with the corner point 33 of the parking spot to turn the vehicle 2 into the parking spot 15.

To generate the base field, individual position points on each of the paths are selected. To do so, preferably a grid covering the area of the base field is generated. The paths themselves are calculated with a sufficiently high resolution so that there is one path point for each selected grid point. The grid points may be equidistant, i.e., arranged at constant distances between neighboring grid points. To be able to limit the number of position points, the grid points may also be defined with varying distances. The distance between two neighboring grid points preferably increases with the distance of the grid points from the origin of the set of paths. For example, the distances of the grid points may be increased with the square of their distance from the destination point. Thus the grid distance and also the interpolation error are lower, the shorter the distance between the vehicle and the destination point.

Figure 6:
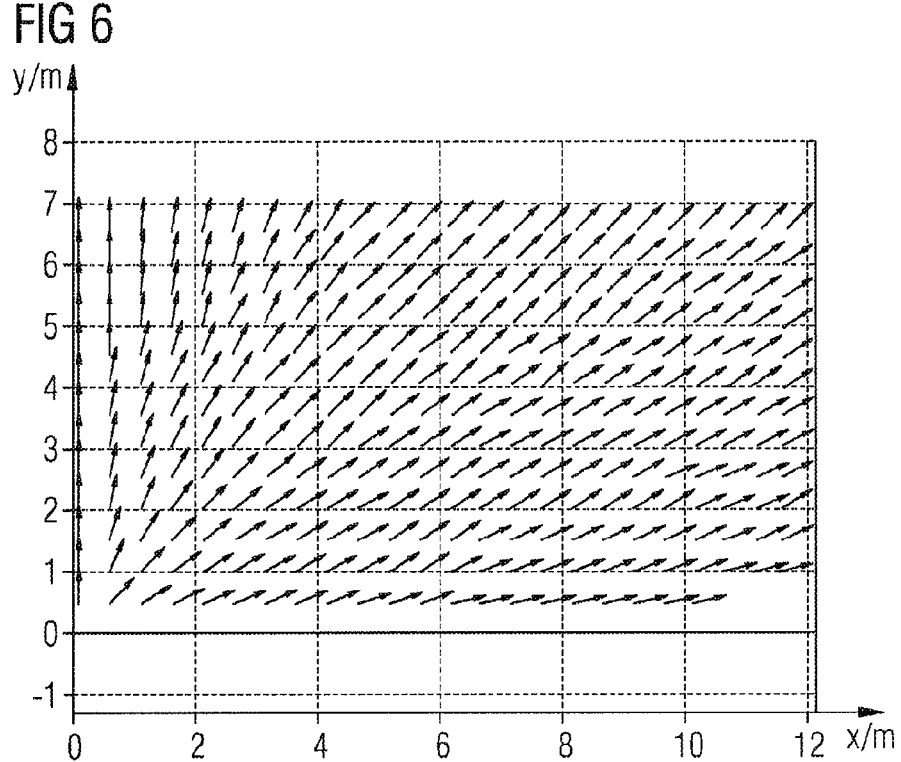
FIG. 6 shows the target orientations of the base field at the site of the position points assigned to them.

The angle of the tangent to the path in this position point is assigned to each position point. This tangent angle indicates the direction of the path at the position point. Thus each path is represented by a vector (X, Y, Z) in the base field, said vector containing the coordinates of the position points $(x_i, y_i)$ and the path directions $\theta_i$ at the individual position points i of the path:

$$\begin{pmatrix} X \\ Y \\ Z \end{pmatrix} = \begin{matrix} [x_1(s_1), x_2(s_2) \ldots x_n(s_n)] \\ [y_1(s_1), y_2(s_2) \ldots y_n(s_n)] \\ [\theta_1(s_1), \theta_2(s_2) \ldots \theta_n(s_n)] \end{matrix}$$

where $s_i$ denotes the distance of the respective position point along the path from the destination point of the paths. The base field itself is generated in the form of an allocation table containing the vector data of the individual paths of the base field. FIG. 6 shows in a graphic illustration an example of target orientations defined in the base field as direction vectors $\theta_i(s_i)$ at the site of the position points $(x_i(s_i), y_i(s_i))$ assigned to each of them.

Similarly, a field of transfer points is generated, with a corner point having the coordinates $(X_{vp,i}, Y_{vp,i})$ being defined for each corner point $(CP_{x,y,i})$ 33 of the parking spot 15:

$$\begin{pmatrix} X \\ Y \\ Z \end{pmatrix} = \begin{matrix} [CP_{x,1}, CP_{x,2} \ldots CP_{x,n}] \\ [CP_{y,1}, CP_{y,2} \ldots CP_{y,n}] \\ [X_{vp,1}, X_{vp,2} \ldots X_{vp,n}] \end{matrix}$$

and $$\begin{pmatrix} X \\ Y \\ Z \end{pmatrix} = \begin{matrix} [CP_{x,1}, CP_{x,2} \ldots CP_{x,n}] \\ [CP_{y,1}, CP_{y,2} \ldots CP_{y,n}] \\ [Y_{vp,1}, Y_{vp,2} \ldots Y_{vp,n}] \end{matrix}$$

This field is also stored in an allocation and/or lookup table. The allocation table for the X coordinates of the transfer points $X_{vp}(CP_X, CP_y)$ is almost independent of $CP_y$. To save on memory space, this allocation table is approximated by an affinity function using the method of least error squares. This function may be stored in the form of two coefficients a and b. The X coordinates of the transfer points are obtained from this as:

$$X_{vp}(CP_x, CP_y) \cong X_{vp}(CP_x) \cong a \cdot CP_x + b$$

One example of a field of transfer points is plotted in a graph in FIG. 4 in which the transfer points determined in the field are superimposed on the paths of the base field in the form of circles.

Figure 7:
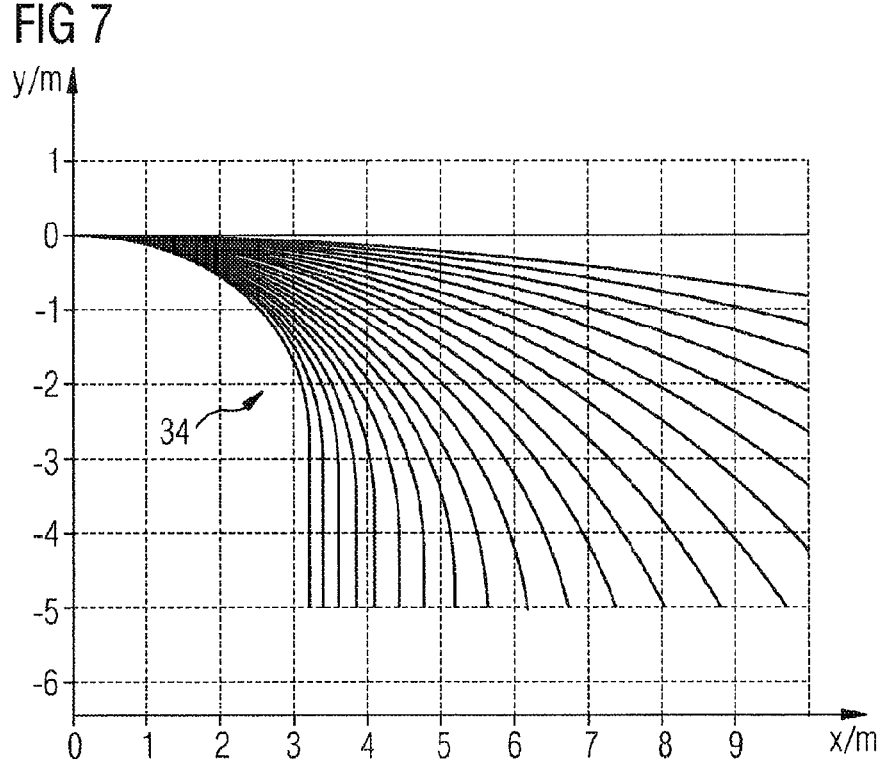
FIG. 7 shows an example of a set of paths for a transition field.

The second orientation subfield, also referred to below as a transfer field, is constructed like the base field from a set of paths with a common origin. However, unlike the base field, all paths in the common origin have the same direction $\theta_o=0$. A curve to the right from the origin so that, as shown in FIG. 7, the field is defined exclusively beneath the x axis. As was already the case with the base field, the grid divisions may be uneven, i.e., the distances from the position points to the paths may increase with an increase in path distance and thus with an increase in the distance from the origin (e.g., quadratic). If the vehicle is not exactly at one of the position points in parking, then these, like the target orientation to be assumed, are interpolated from the surrounding position points and the target orientations assigned to them.

Figure 8:
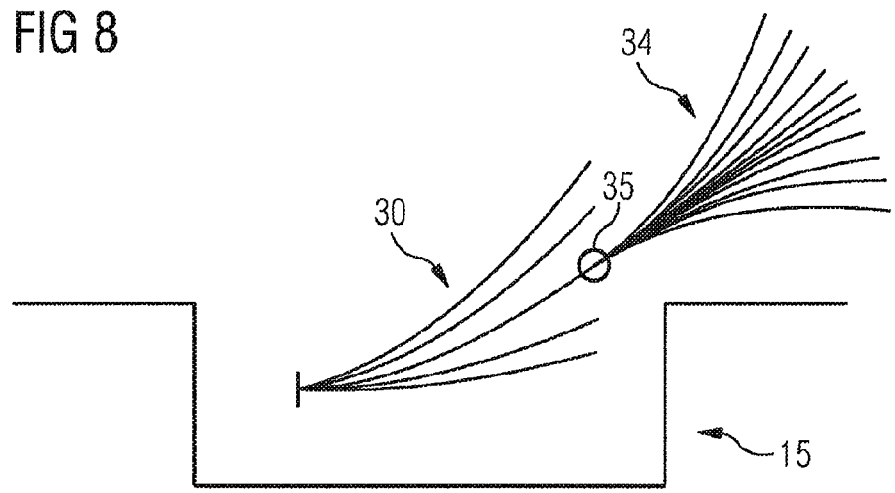
FIG. 8 shows an example of a combination of the base field and the transfer field 5.
Figure 9:
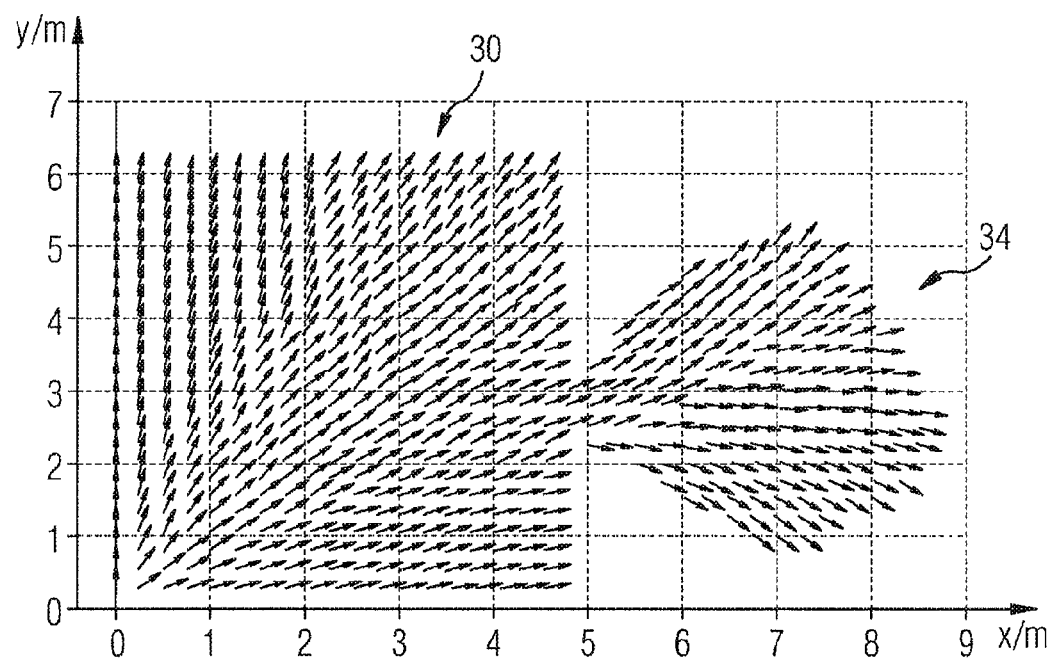
FIG. 9 shows the target orientations defined in the orientation field formed according to the example of FIG. 7 as direction vectors at the respective position points.

The orientation field is assembled from the two orientation subfields, namely the base field and the transfer field. To do so, the transfer point belonging to the current corner point 33 of the parking spot is determined and is associated with the shared origin of the transfer field. Then the transfer field is rotated about the selected transfer points so that the slope of the paths of the transfer field corresponds to the target orientation of the transfer point in the base field. Thus as can be deduced from the diagram of the suitably linked set of paths 30 of the base field with the set of paths 34 at the transfer point 35 in FIG. 8, a study transition of the vehicle from one path of the transfer field to a path of the base field and/or origin field is possible without a sudden change in direction. FIG. 9 shows the target orientations of the orientation field assembled from the base field and the transfer field as done in FIG. 8 as direction vectors at the site of the respective position points.

In a flow chart, FIG. 10 shows the essential method steps performed by the parking assistant in assisting the driver of the vehicle in the parking maneuver. The parking maneuver begins in step S0, e.g., when the reverse gear is engaged. First, after notification of the parking intent by the driver of the vehicle, the parking space was measured by the sensor device 24, the base field and the transfer field were generated and the transfer point was determined. After the start of the parking maneuver in step S0, the vehicle position and vehicle orientation are first determined in step S1, e.g., with an odometer device. If it is found in the next step S2 that the parking maneuver is already concluded, then in step S3, a stop signal is output to the driver of the vehicle via the operator interface.

However, if the parking maneuver is not yet concluded, then in step S4 a check is performed to determine whether the vehicle 2 is in the base field or in the transfer field. If the data of the vehicle position determination indicate a position in the base field, then in step S5, the target orientation assigned to the current position is read out of the allocation table for the base field. However, if the vehicle 2 is in the transfer field, then in step S7, the target orientation assigned to the current position is instead read out of the allocation table for the transfer field.

Depending on which orientation subfield the vehicle 2 is in, then a check is performed either in step S6 or in step S8 to ascertain whether an obstacle has been detected by the sensor device 24 in the parking path taken. If this is the case, then in step S9, a new "emergency" orientation is calculated on the basis of the sensor data, i.e., a substitute direction bypassing the obstacle is calculated. Otherwise, in step S10 the required steering angle is calculated on the basis of the deviation of the vehicle orientation from the target orientation and/or the "emergency" orientation, as is also done after calculation of the substitute orientation. In step S11, the calculated steering angle is output to the steering control 26. Next the method continues with measurement of the vehicle position and orientation in step S1.

The method described here which is performed by the parking assistant 20 and by the parking path guidance device 21 set up therein essentially through the software program, allows a great flexibility in the "choice" of the parking path. The drivability of the parking path pursued initially can be monitored constantly by means of the monitoring of the vehicle environment by the sensor device 24. If this parking path would lead to a collision, then first a bypass path is determined and next the vehicle is guided along a new parking path to the destination point on the basis of the target orientation fields. The bypass may be accomplished by a recombining the first and second orientation subfields with a new transfer point such that the vehicle follows a path of the transfer field whose direction at the site of the vehicle corresponds to the "emergency" orientation.

Especially in the case of narrow, i.e., small parking space, the vehicle 2 cannot generally be brought into a correct parking position in one maneuver. Therefore, the parking maneuver is usually performed in several steps, preferably as few as possible. In the first step, the vehicle drives as far as possible into the parking spot which is available in the space. In the second step and possibly in other subsequent steps, the vehicle maneuvers within the parking spot until its longitudinal axis is approximately parallel to the side border of the parking spot. This shall now be illustrated on the basis of the following figures.

The parking path guidance device (21) and additional components of the parking assistant 20 are preferably designed as data processing equipment on which a program code suitable for execution of the method described here is executed. The execution of the program code leads to establishment of the components of the parking path guidance device (21) described here and leads to completion of the other equipment of the parking assistant 20. The program code may be available independently in the form of a computer program product. In particular, the computer program product may assume the form of a data medium or a memory device containing the program code in the form of various differentiable states which can be read by a data processing device and executed as program instructions. In addition all media capable of containing or transmitting certain states are regarded as being computer program product, e.g., Internet connections to nodes over which the program code can be input by a data processing system.

Figure 11A:
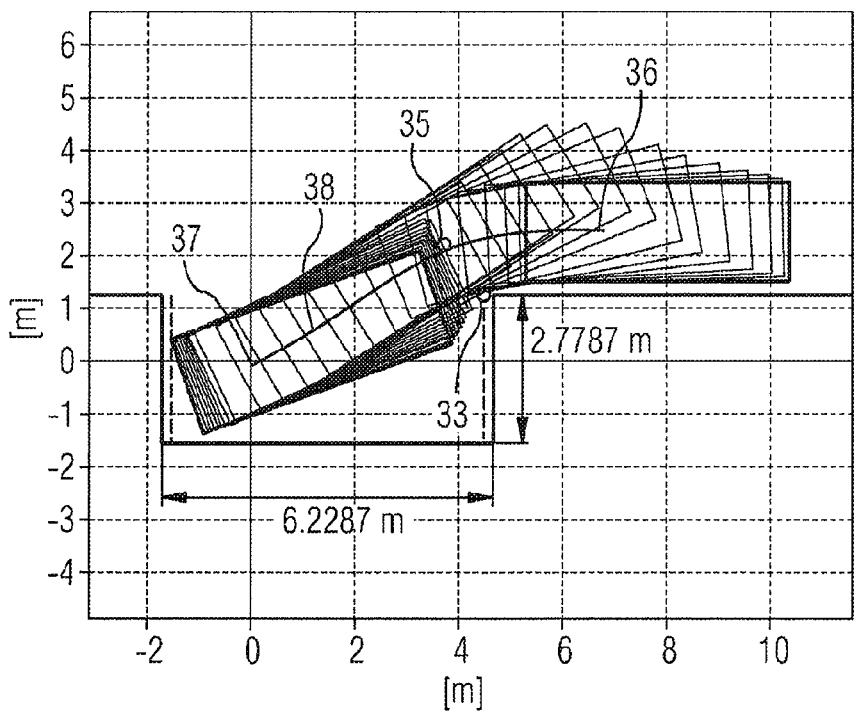
FIG. 11 shows an example of a two-step parking maneuver with the help of the parking assistant.
Figure 11B:
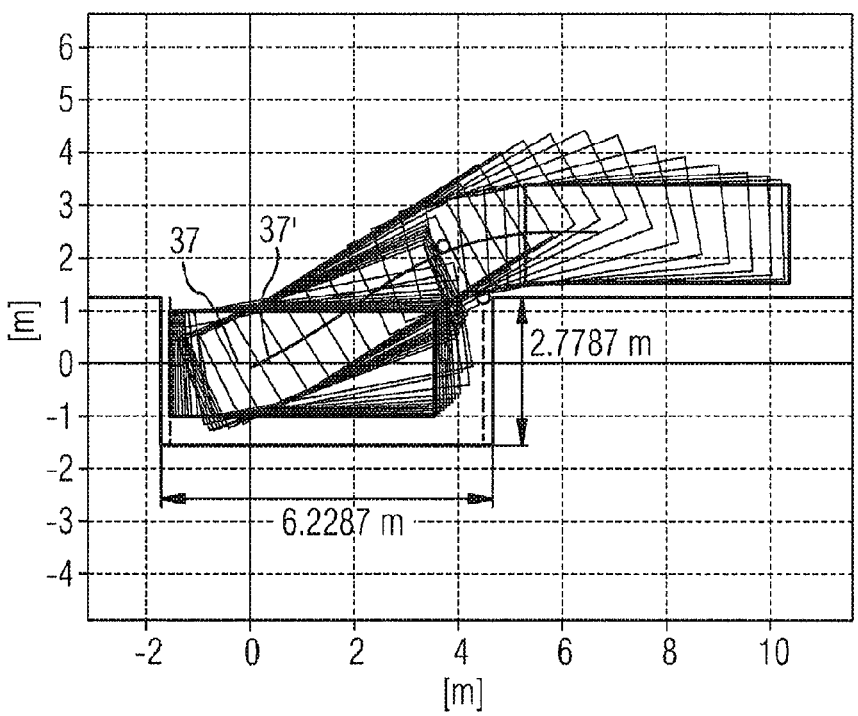

FIG. 11 shows a conventional two-step maneuver of parking in a parking space. In illustration a), the corner point 33 of the parking space and the transfer point 35 between the transfer field and the base field are marked. In both illustrations, the intermediate stations of the parking maneuver are assumed. In the first step, shown in FIG. 11A, the vehicle 2 travels from the starting position 36 to the destination point 37. In the second step shown in FIG. 11b, the vehicle 2 follows the target orientations of another path which guides its longitudinal axis approximately parallel to the side border of the parking spot and stops the vehicle 2 in a straight position at the end point 37'.

The diagrams in FIG. 12 present a comparison of the parking paths at two different vehicle speeds. In FIG. 12a the vehicle parks at a speed of 1.5 meters per second. During its approach to the destination point 36 it approaches the straight position in the parking spot approximately asymptotically, i.e., it approaches the target orientation $\theta=0$. In the second case, which is illustrated in FIG. 12b, the vehicle speed is 2.5 meters per second. In this case, the vehicle is following a different parking path which it travels first beyond the straight position characterized by $\theta=0$ and then back into approximately the same position. The parking path describes, "vibrates," so to speak, beyond the straight position, whereupon the distance from the side border of the parking space, e.g., from the curb is also taken into account.

Figure 13A:
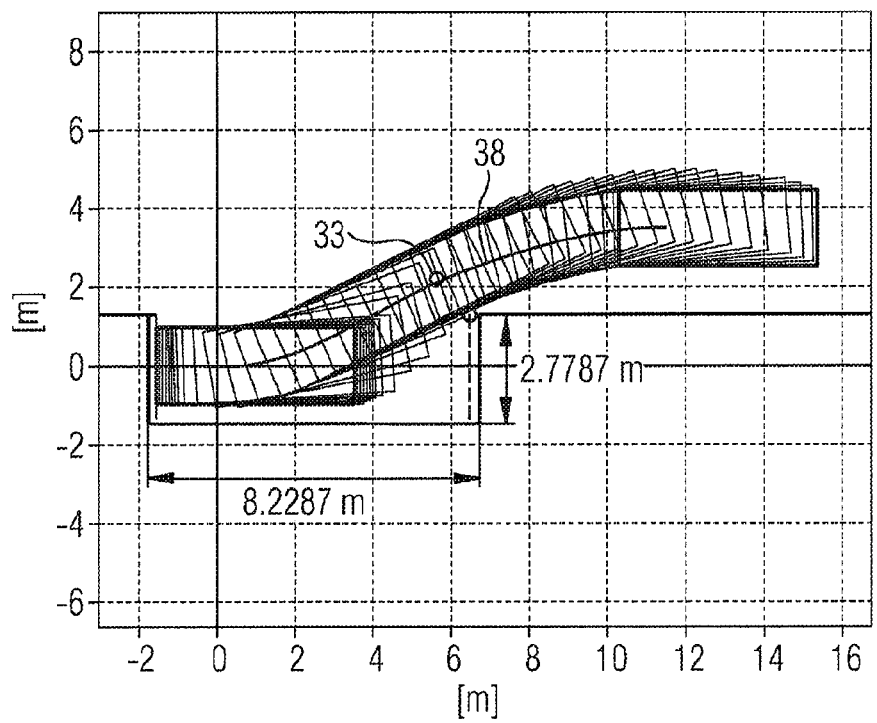
FIG. 13 shows the response of the parking assistant to displacement of the corner point of the parking spot.
Figure 13B:
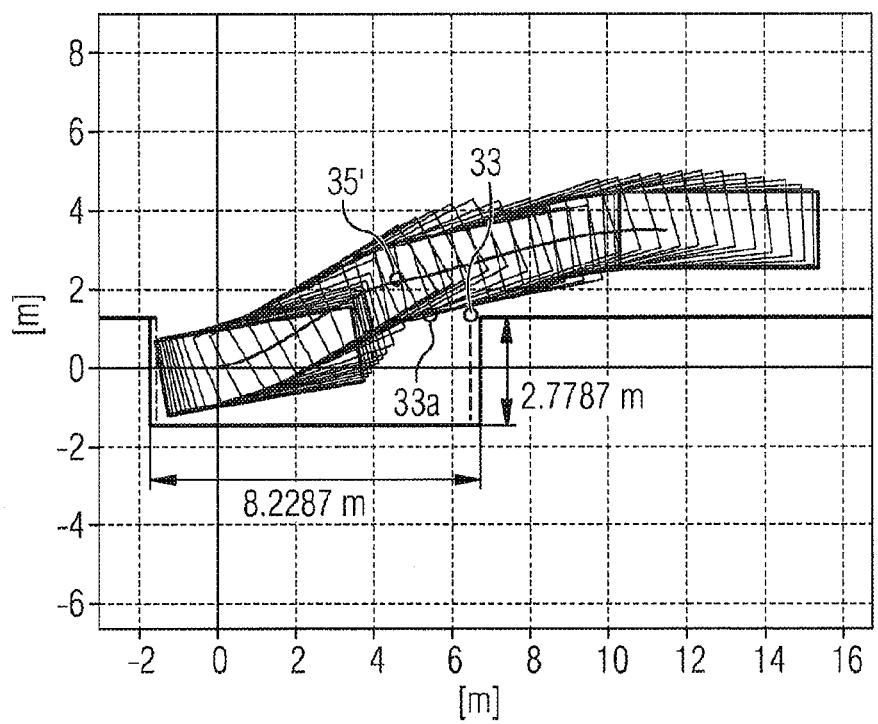

The parking assistant 20 described above, however, allows not only handling of narrow parking spaces and different vehicle speeds, but also allows the driver to respond to changes in the environment of the vehicle 2 to be parked. The plots in FIG. 13 illustrate the response of the parking assistant 20 to a shift in the corner point 33 of the parking space. This occurs, for example, when the vehicle bordering the parking space at the front suddenly drives back somewhat during the operation of parking vehicle 2. For comparison, FIG. 13a shows the parking maneuver that would result with an invariable parking space dimension. FIG. 13b shows the parking path 38 adapted to the displacement of the corner point 33 to the new position 33a. This displacement path of the corner point 33 is presumably also detected by means of the sensor device 24, mainly with the sensors directed toward the rear and toward the right of the vehicle 2. The newly positioned corner point is recognized as an obstacle that must be bypassed without collision by the parking path guidance device 21. Accordingly, a new transfer point 35' is determined from the field of transfer points and the transfer field is linked to this new transfer point with the base field. In the final effect, this leads to a grading of the parking path 38 until it is possible to turn into the parking space about the new corner point. Then the vehicle 2 follows the target orientations of the base field to the destination point 37.

If the vehicle which is bordering the parking space to the rear moves into the parking space, then the destination point of the base field and thus the base field itself are shifted forward. Since this ultimately only shortens the parking space, this case corresponds essentially to the case of a shift in the corner point 33 as described above.

Figure 14A:
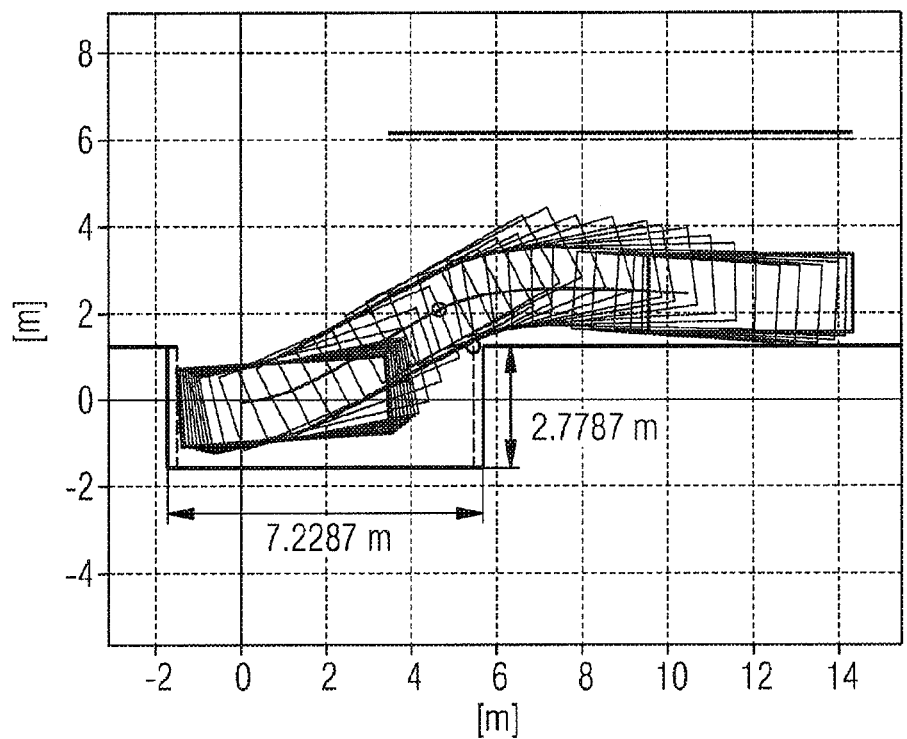
FIG. 14 shows the response of the parking assistant to a narrowing of the pivot range.
Figure 14B:
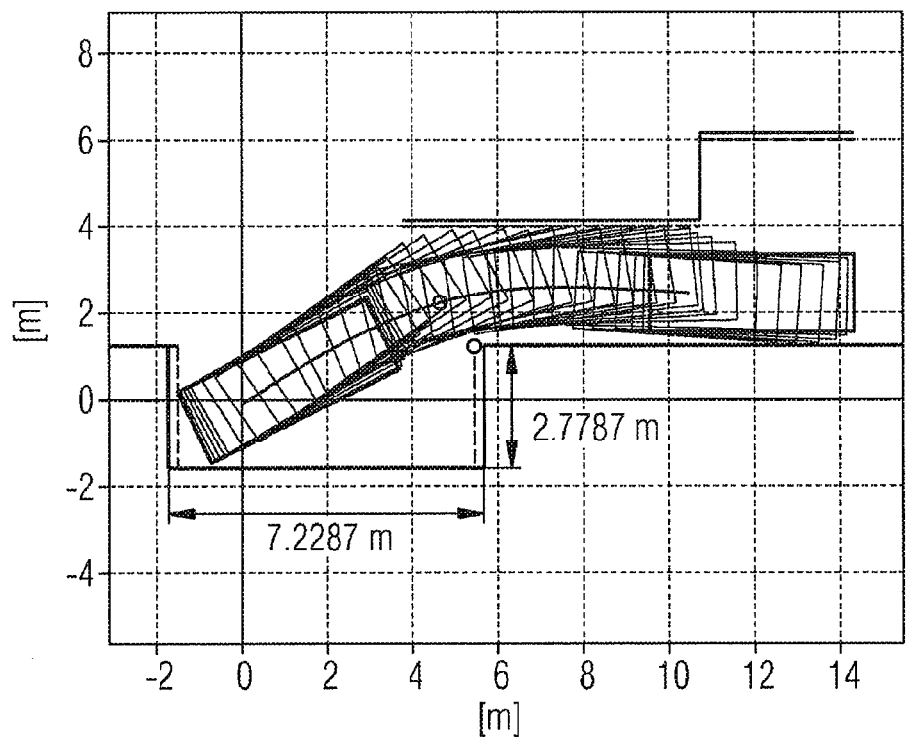

FIG. 14 depicts the response of the parking assistant 20 to a change in the swivel space. FIG. 14a shows the parking maneuver as it would occur with a sufficiently large pivot room. However, if the parking assistant 20 detects a sudden limitation of the pivot space with the help of the sensor device, e.g., because a delivery vehicle is parking in the second row next to the vehicle to be parked, so the vehicle 2 can no longer follow the target orientations originally preselected if a collision is to be prevented. Therefore, as shown in FIG. 14b, the vehicle will move along an "emergency" orientation across the paths of the set of paths of the orientation field generated before the start of the parking maneuver and resumes the stipulations of the orientation field again only when the target orientations defined therein allow a swinging movement in and out without a collision. This "emergency" orientation may be accomplished for example by a recreation of the binding of the transfer field to the base field.

The parking assistant described above preselects a field of locally defined target orientations (instead of a target path for the parking path), each target orientation indicating the direction of a path leading to the destination point at the respective site. A deviation from this path, e.g., because of an increased vehicle speed or because of the need for driving around an obstacle always leads to an alternative path along which the vehicle approaches the destination point again on the basis of the predefined target orientations. Control of the steering angle is limited to correction of the vehicle orientation according to the target orientation defined for the respective position point and thus ensures reliable guidance of the vehicle to the destination point. With the present invention, not only does this eliminate a complex reguidance of the vehicle to a target path departed from during the parking maneuver but instead it is also possible to respond in a flexible manner to changes in the parking situation, e.g., a change in the vehicle speed, a change in the size of the parking space, a limitation of the pivot space or the like.

The invention claimed is:

1. A method for controlling the steering of a vehicle during a parking maneuver, said method comprising:
    measuring a parking spot selected for parking the vehicle;
    generating an orientation field, which determines a number of position points within the selected parking spot and in the environment of the selected parking spot and assigns a target orientation to each position point;
    determining a position and orientation of the vehicle to be parked relative to the position points of the orientation field; and
    controlling a steering angle of the vehicle in such a way that the orientation of the vehicle at a position point assumes essentially the target orientation assigned to this position point in the orientation field,
    wherein as soon as it is recognized that there is a risk of collision with an obstacle if the target orientations of the orientation fields are followed, the vehicle is driven along an orientation leading around the obstacle until there is no longer a risk of collision.

2. The method according to claim 1, wherein one of the position points from the number of position points forms the destination point of a parking path of the vehicle.

3. The method according to claim 2, wherein the target orientation assigned to a position point corresponds to the orientation of the tangent to a parking path leading through the position point.

4. The method according to claim 2, wherein all parking paths defined on the basis of the target orientation of the position points have the same destination point.

5. The method according to claim 1, wherein the orientation field is constructed from a first orientation subfield and a second orientation subfield such that the first orientation subfield comprises the target orientations assigned to the parking spot, and the second orientation subfield comprises the target orientations assigned to a corner point of the parking spot.

6. The method according to claim 5, wherein all parking path segments defined by the target orientations of the position points of the second orientation subfield end in a common position point.

7. The method according to claim 6, wherein the second orientation subfield is connected to the first orientation subfield in such a way that the position of the common position point corresponds to the position of a position point of the first orientation subfield whose distance from the corner point of the parking spot is large enough that the vehicle situated at this position point does not come in contact with the corner point of the parking spot in the target orientation predefined at this position point.

8. The method according to claim 7, wherein the second orientation subfield is rotated on connection to the first orientation subfield, such that the target orientation of the shared position point of the second orientation subfield corresponds to the target orientation of the position point of the first orientation subfield with whose position the shared position point is brought into correspondence.

9. The method according to claim 1, wherein control the steering angle of the vehicle at a position point of the orientation field is achieved on the basis of the deviation between the actual orientation assumed by the vehicle at this orientation point and the target orientation predefined for this position point.

10. The method according to claim 1, wherein the steering angle required for the orientation leading around the obstacle is calculated from the distance determined by the sensor device according to a predetermined rule which takes into account a minimum distance of the vehicle from the obstacle to be maintained.

11. The method according to claim 1, wherein the orientation leading around the obstacle is accomplished by generating a new orientation field by means of a shift of the common position point of the second orientation subfield to another position point of the first orientation subfield whose distance from the obstacle and whose target orientation are suitable so that the vehicle at this additional position point does not come in contact with the obstacle at the target orientation predefined at this position point.

12. The method according to claim 1, wherein orientation leading around the obstacle runs parallel to the side border of the parking spot.

13. The method according to claim 1, wherein the destination point of the parking paths used as the basis for the orientation field is shifted.

14. A device for controlling the steering of a vehicle during a parking maneuver, comprising:
    a sensor device which is designed for measuring a parking spot and for detecting an obstacle;
    a vehicle position determining device which is designed at least for determining the vehicle position and the vehicle orientation;
    a gear selection detecting device, which is designed for output of a signal representing the gear currently engaged in the vehicle;
    an operator interface for input of instructions from the driver of the vehicle and/or for output of information to the driver of the vehicle;
    an electromechanical control unit for control of the steering angle of the vehicle; and
    a parking path guiding device for calculating the steering angles to be set by the electromechanical control unit for guidance of the vehicle along a parking path,
    whereby the parking path guiding device comprises:
    a parking spot determining device which is designed in cooperation with the sensor device for determining the geometry of the parking spot selected for parking the vehicle and of obstacles in the environment of the vehicle;
    an orientation field creating device which is designed for creating an orientation field which determines a number of position points within the selected parking spot and in the environment of the selected parking spot and assigns a target orientation to each position point;

an orientation deviation device, which is designed for determining the deviation of the current vehicle orientation at a position point from the target orientation predefined by the orientation field; and a steering angle preselection device which is designed for calculation of a steering angle stipulation for the electromechanical control unit on the basis of the deviation in orientation of the vehicle from the target orientation and for forwarding the steering angle stipulation to the electromechanical control unit, wherein as soon as it is recognized that there is a risk of collision with an obstacle if target orientations of the orientation fields are followed, the vehicle is driven along an orientation leading around the obstacle until there is no longer a risk of collision.

15. The device according to claim 14, wherein the vehicle position determining device is designed for determining the vehicle position and the vehicle orientation on the basis of the measurement of the movement of at least one wheel of the vehicle.

16. The device according to claim 14, wherein the parking path guiding device is configured to:

measure a parking spot selected for parking the vehicle;

generate an orientation field, which determines a number of position points within the selected parking spot and in the environment of the selected parking spot and assigns a target orientation to each position point;

determine a position and orientation of the vehicle to be parked relative to the position points of the orientation field; and control a steering angle of the vehicle in such a way that the orientation of the vehicle at a position point assumes essentially the target orientation assigned to this position point in the orientation field, wherein as soon as it is recognized that there is a risk of collision with an obstacle if the target orientations of the orientation fields are followed, the vehicle is driven along an orientation leading around the obstacle until there is no longer a risk of collision.

17. The device according to claim 14, wherein the parking path guidance device comprises a data processing system.

18. A nontransitory computer program product for controlling the steering of a vehicle during a parking maneuver whereby the computer program product has a number of physically differentiable states which are readable and executable by a data processing system and which represent a sequence of instructions which are executed on a data processing system, to:

measure a parking spot selected for parking the vehicle;

generate an orientation field, which determines a number of position points within the selected parking spot and in the environment of the selected parking spot and assigns a target orientation to each position point;

determine a position and orientation of the vehicle to be parked relative to the position points of the orientation field; and control a steering angle of the vehicle in such a way that the orientation of the vehicle at a position point assumes essentially the target orientation assigned to this position point in the orientation field, wherein as soon as it is recognized that there is a risk of collision with an obstacle if the target orientations of the orientation fields are followed, the vehicle is driven along an orientation leading around the obstacle until there is no longer a risk of collision.

* * * * *

UNITED STATES PATENT AND TRADEMARK OFFICE
CERTIFICATE OF CORRECTION

PATENT NO.        : 8,645,015 B2
APPLICATION NO.   : 12/528588
DATED             : February 4, 2014
INVENTOR(S)       : Oetiker et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this
Twenty-ninth Day of September, 2015

Michelle K. Lee
*Director of the United States Patent and Trademark Office*